United States Patent [19]

Martens

[11] Patent Number: 4,953,018
[45] Date of Patent: Aug. 28, 1990

[54] TELEVISION TRANSMISSION SYSTEM USING TRANSMISSION OF BASIC PICTURE WEIGHTING FACTORS

[75] Inventor: Jean B. O. S. Martens, Eindhoven, Netherlands

[73] Assignee: U.S. Philips Corporation, New York, N.Y.

[21] Appl. No.: 339,548

[22] Filed: Apr. 17, 1989

[30] Foreign Application Priority Data

May 3, 1988 [NL] Netherlands .................. 8801154

[51] Int. Cl.$^5$ ........................................... H04N 7/133
[52] U.S. Cl. ..................................... 358/133; 358/135
[58] Field of Search ................ 358/133, 135, 136, 138

[56] References Cited

U.S. PATENT DOCUMENTS 4,831,440  5/1989  Borgers ............................... 358/133
4,833,535  5/1989  Ozeki ................................. 358/135

*Primary Examiner*—Howard W. Britton
*Attorney, Agent, or Firm*—Michael E. Marion

[57] ABSTRACT

In a television transmission system for digital picture signals each picture is partitioned into sub-pictures of $N_1 \times N_2$ pixels for limiting the bit rate. Each sub-picture is subjected to a forward picture transform for generating basic picture weighting factors. To this end each sub-picture is multiplied by a reference picture which has different values for different pixels (for example, as described by a Gauss function). This multiplied sub-picture is subsequently multiplied by a number of kernel pictures so that the said basic picture weighting factors are obtained. Each kernel picture is equal to the product of the reference picture and a basic picture. Of the collection of basic pictures each basic picture is an orthogonal polynomial associated with the square value of the reference picture. For regaining the original sub-pictures each weighting factor is multiplied by the original kernel picture from which the weighting factor is obtained. Each weighting factor of a sub-picture thus supplies an auxiliary sub-picture. Summation of all auxiliary sub-pictures yields a replica of the original sub-picture.

10 Claims, 4 Drawing Sheets

FIG. 3

TELEVISION TRANSMISSION SYSTEM USING TRANSMISSION OF BASIC PICTURE WEIGHTING FACTORS

BACKGROUND OF THE INVENTION

(1) Field of the Invention

The invention generally relates to a television transmission system for transmitting television pictures in a digital format from an encoding station to a decoding station via some transmission medium.

More particularly, the invention relates to a television transmission system in which the encoding station comprises a picture transform circuit for performing a forward transform to generate so-called basic picture weighting factors and in which the decoding station comprises a weighting factor transform circuit for performing an inverse transform.

Such a television system may form part of a television broadcasting system, in which case the encoding station forms part of the television broadcasting transmitter and each TV receiver is provided with a decoding station. In this case the transmission medium is the atmosphere.

Such a system may also form part of a video recorder, in which case the video tape is the transmission medium.

(2) Description of the Prior Art

In picture encoding it is common practice to consider a picture as a matrix of $E_1 \times E_2$ pixels each having a given luminance and color, if any. It will hereinafter be assumed that the picture only comprises half tones and the luminance of a pixel will be indicated by means of the pixel value. When digitising such a picture, a number (in a binary form) is assigned to each pixel. This number may indicate the pixel value itself, or, for example the difference between the pixel values of two contiguous pixels. In the former case a digital picture in a canonical form, or shortly a canonical picture is concerned.

If 8 bits are used for representing the pixel value of a canonical picture, this means that a conventional canonical picture of $576 \times 720$ pixels requires approximately $3 \times 10^6$ bits for its representation, which with a transmission of 25 pictures per second leads to a bit rate of approximately $75 \times 10^6$ bits/second. Generally, this is unacceptbly high. The object of the encoding station is to convert this canonical picture into a non-canonical picture which can be represented with a considerably lower number of bits.

Different methods are known for this conversion, for example the above-mentioned method in which a number is assigned to each pixel, indicating the difference between the pixel values of two contiguous pixels. This method is known under the name of Differential Pulscode Modulation, abbreviated DPCM. Another method is to subject the canonical picture to a forward picture transform. To this end the picture is partitioned into sub-pictures of $N_1 \times N_2$ pixels each, which are each considered as a sum of mutually orthogonal basic pictures $B_{q,r}$ also of $N_1 \times N_2$ pixels each and each with its own weighting factor $Y(B_{q,r})$. As a result of the correlation between the pixels of a sub-picture the information is concentrated in a limited number of basic pictures. Only the associated weighting factors are important and the other weighting factors can be ignored.

To determine the weighting factors, $N_1$ is generally taken to be equal to $N_2$ in practice and a sub-picture is mathematically considered as an $N \times N$ matrix $X$ and the weighting factors are also arranged in accordance with an $N \times N$ matrix which will be denoted by $Y$. Furthermore, an orthogonal $N \times N$ transform matrix $A$ is defined which is related to the chosen collection of basic pictures $B_{q,r}$. More particularly it holds that:

$$B_{q,r}=A_q A_r^T \quad (1)$$

Here $A_q$ represents an $N \times N$ matrix in which each column is equal to the q-th column of the transform matrix $A$ and $A_r^T$ represents a matrix each row of which is equal to the r-th row of the matrix $A$. The said weighting factors now follow from the matrix multiplication $$Y=A^T \times A \quad (2)$$

In this expression $A^T$ represents the transposed matrix of $A$.

For more information on the above, reference is made to Reference 1.

The number of weighting factors which must be transmitted appears to be closely related to the structure of the chosen basic pictures and, in conjunction therewith the chosen transform-matrix A. In this connection the Karhunen-Loeve transform matrix (see for example Reference 2, pages 259–264) is found to be optimum. However, it is difficult to implement. Nowadays the discrete cosine transform, abbreviated DCT is generally considered to be the best alternative (see Reference 2).

In practice it is found that the number of weighting factors qualified for transmission may greatly differ from sub-picture to sub-picture. To be able to make a selection, all coefficients must always be calculated.

OBJECT AND SUMMARY OF THE INVENTION

The invention has for its object to provide a television transmission system of the type described above in which only those coefficients are determined which are qualified for transmission.

According to the invention:
the picture transform circuit for performing the forward transform is adapted:
(i) to multiply each sub-picture by reference picture having different values for different pixels sp that each time a product sub-picture is obtained;
(ii) to multiply each product sub-picture by a number of kernel pictures for generating a number of blocks of product element values corresponding to the number of kernel pictures, each kernel picture being equal to the product of the reference picture and a basic picture from a collection of basic pictures each being formed by an orthogonal polynomial associated with the square of the reference picture;
(iii) to add the product element values of a block for generating a weighting factor;
the weighting factor transform circuit for performing the inverse transform is adapted:
(iv) to multiply each weighting factor by a kernel picture for generating a number of auxiliary sub-pictures;
(v) to sum the auxiliary sub-pictures obtained;
(vi) to divide each auxiliary sub-picture obtained by a correction picture which is equal to the sum of versions of the reference picture shifted over the sub-picture.

REFERENCES

1. Real-Time Orthogonal Transformation of Colour-Television Pictures; H. Bacchi, A. Moreau; Philips Technical Review, Volume 38, No. 4/5, 1978/1979 pages 119–130.
2. Digital Image Processing; W. K. Pratt; John Wiley and Sons,
3. Scene Adaptive Coder; W. R. Chen, W. K. Pratt; IEEE Transactions on Communications, Volume COM-32, No. 3, Mar. 1984, pages 225–232.

EXPLANATION OF THE INVENTION

BRIEF DESCRIPTION OF THE FIGURES

FIG. 3 shows a partitioning of a picture into sub-pictures and

GENERAL STRUCTURE OF THE TELEVISION TRANSMISSION SYSTEM

Figure 1:
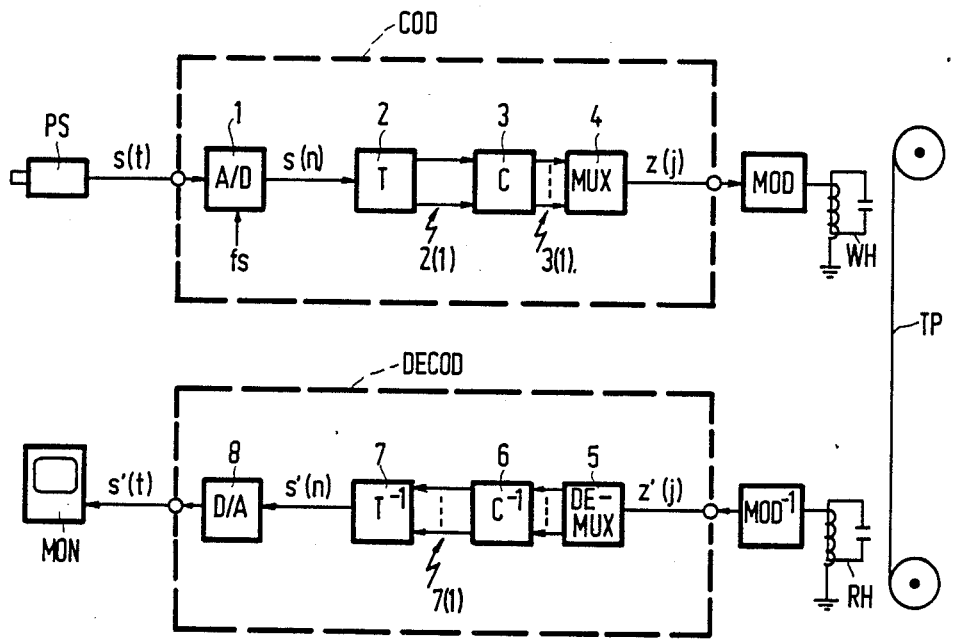
FIG. 1 shows diagrammatically a video recorder provided with the television transmission system.

FIG. 1 shows diagrammatically a video recorder provided with the television transmission system according to the invention. It comprises an encoding station COD and a decoding station DECOD. The encoding station receives a video signal s(t) which is supplied by a picture signal source PS, for example a video camera. The signal z(j) supplied by the encoding station COD is recorded on a magnetic tape TP via a modulator circuit MOD and a write head WH. To regain the original picture signal, the information recorded on the magnetic tape is converted by a read head RH into an electric signal which is applied to the decoding station DECOD after demodulation in a demodulator $MOD^{-1}$. This decoding station supplies an analog picture signal s'(t) for a monitor MON.

In the encoding station COD the analog picture signal s(t) is sampled in an analog-to-digital converter 1 at a suitably chosen sampling frequency $f_s$ of, for example 13.5 MHz and the picture signal samples thus obtained and conventionally referred to as pixel values are encoded in, for example 8-bit PCM words s(n). These amplitude-discrete pixel values are subsequently applied to a picture transform circuit 2 for performing a forward transform. It supplies a block of weighting factors which are simultaneously available at a number of parallel outputs 2(1). These weighting factors are further applied to an encoding circuit 3 for quantisation and encoding. The encoded weighting factors supplied thereby via parallel outputs 3(1) are converted into a serial sequence in a multiplex circuit 4.

In the decoding station DECOD the signal supplied by the demodulator $MOD^{-1}$ is converted in a demultiplex circuit 5 into blocks of associated weighting factors which occur at parallel outputs. Each block is in turn applied to a decoding circuit 6 for decoding the separate weighting factors in the block and subsequently applied to parallel inputs 7(1) of a weighting factor transform circuit 7 for performing an inverse transform. This circuit supplies a series of signal samples s'(n) which are converted in a digital-to-analog converter 8 into the analog picture signal s'(t) which can be displayed on the monitor M.

The Transform Circuits

Figure 2:
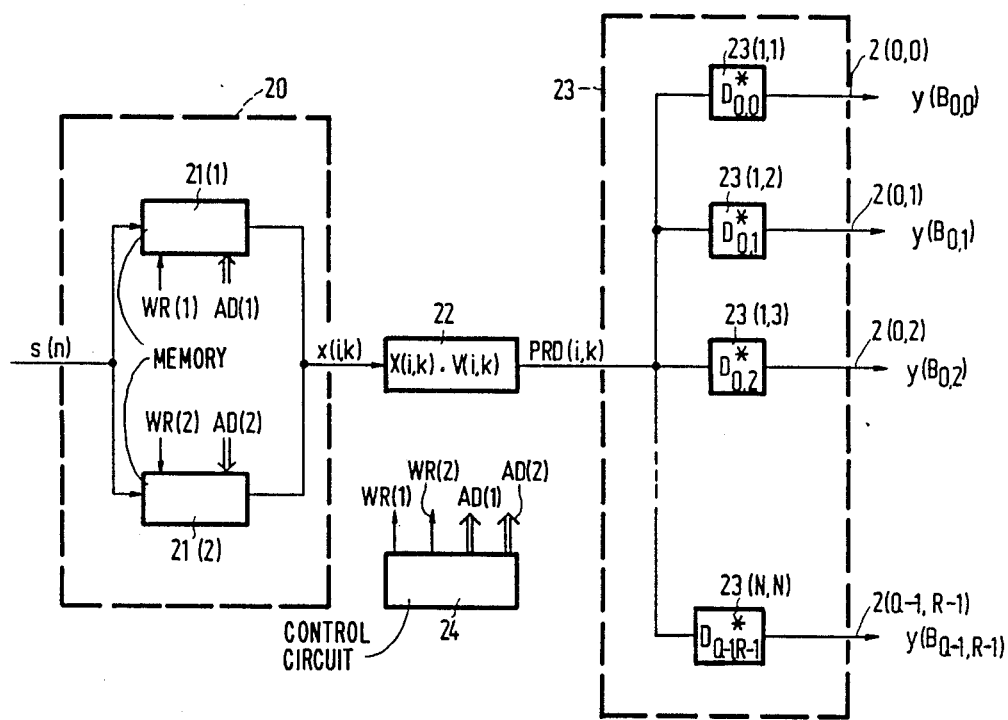
FIG. 2 shows an embodiment of a picture transform circuit for performing a forward transform.

An embodiment of the picture transform circuit 2 for performing a forward two-dimensional transform is shown in FIG. 2. It comprises a sub-picture forming circuit 20 constituted by two picture memories 21(1) and 21(2). These memories have addressable memory locations and are controlled by write-read commands WR(1) and WR(2) in such a way that the pixel values s(n) of the pixels of the lines of two successive fields of a picture are written in one of them, whilst simultaneously the pixel values of the lines of the two fields of the previous picture, which values are stored in the other picture memory, are read. The address words AD(1) and AD(2) which are applied to the address inputs of these picture memories determine at which location in the picture memory a pixel value is stored or which pixel value is read.

Figure 3:
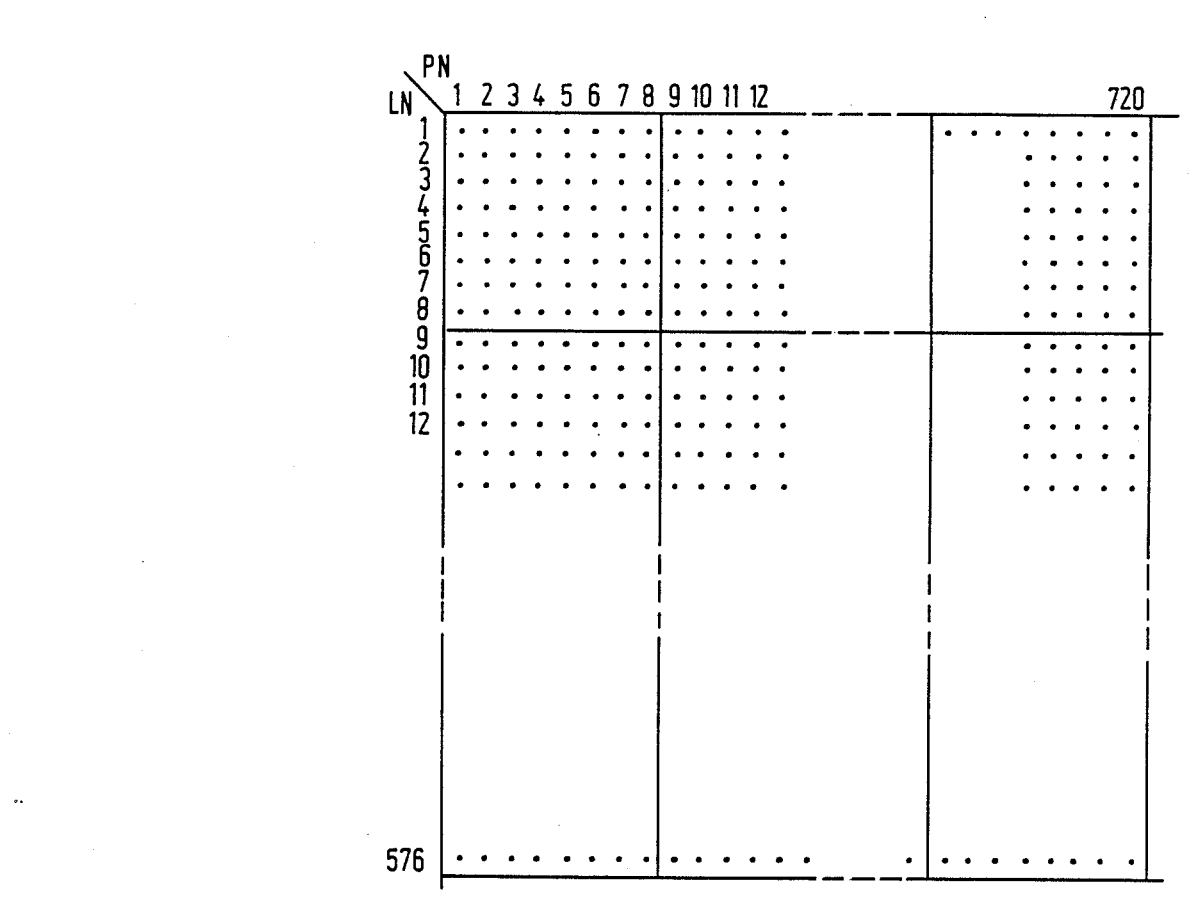

More particulaly, only the pixel values of the visible pixels of the visible lines of a picture are written in the picture memory, namely line by line. After all pixel values of a picture are thus written in the picture memory, it comprises, for example the pixel values of the pixels denoted by dots in FIG. 3. In this FIG. 3 the row numbers LN of the picture memory in which pixel values written are plotted vertically and the column numbers PN of the picture memory in which pixel values are written are plotted horizontally. On reading the contents of the picture memory, each picture is partitioned into sub-pictures of N×N pixels. Such a partitioning is diagrammatically shown in FIG. 3 for N=8. More particularly it has been asssumed for the sake of clarity of the Figure that the sub-pictures adjoin one another. However, in practice it is found to be advantageous if the sub-pictures partly overlap one another. It is to be noted that the write-read commands and the address words can be generated in the conventional manner by means of a control circuit 24.

The pixel values of a sub-picture will hereinafter be denoted by X(i,k) with i,k=1,2, ... N in this case. These pixel values X(i,k) are applied row by row to a multiplier circuit 22. In this circuit the sub-picture is multiplied by a reference picture which will be denoted by V(i,k) and which consists of N×N pixels. This multiplier circuit 22 supplies a product picture PRD(i,k) for each sub-picture. More particularly it holds that:

$$PRD(i,k) = X(i,k) \cdot V(i,k). \tag{3}$$

The product picture PRD(i,k) thus obtained is subsequently applied to a bank of multiplier circuits 23 comprising a number of multiplier and adder circuits; for example Q.R. In each multiplier and adder circuit the product picture PRD(i,k) is multiplied by a kernel picture $D^*_{q,r}(i,k)$; in which q=0,1,2, ... Q-1 and r=0,1,2, ... , R-1. Each multiplier circuit supplies $N^2$ product element values which are added in an associated adder circuit. Multiplier and adder circuit with kernel picture $D^*_{q,r}(i,k)$ now yields the wanted weighting factor $Y(B_{q,r})$ of the basic picture $B_{q,r}$. The collection of kernel pictures used in this case is now chosen to be such that this collection is orthonormal, which means that $$\int_{-\infty}^{\infty}\int_{-\infty}^{\infty} D^*_{q1,r1}(i,k)D^*_{q2,r2}(i,k)di\, dk = \begin{cases} 0 \text{ if } \begin{pmatrix} q1 \neq q2 \\ r1 \neq r2 \end{pmatrix} \\ 1 \text{ if } \begin{pmatrix} q1 = q2 \\ r1 = r2 \end{pmatrix} \end{cases} \quad (4)$$

while furthermore each kernel picture is equal to the product of the reference picture and a basic picture. More particularly it now holds that the basic pictures $B_{q,r}$ are orthogonal polynomials which are associated with the square value of the reference picture chosen; in other words $$D^*_{q,r}(i,k) = B_{q,r}(i,k)V(i,k) \quad (5)$$

$$\int_{-\infty}^{\infty}\int_{-\infty}^{\infty} V^2(i,k)B_{q1,r1}(i,k)B_{q2,r2}(i,k)di\, dk = \begin{cases} 0 \text{ if } \begin{pmatrix} q1 \neq q2 \\ r1 \neq r2 \end{pmatrix} \\ 1 \text{ if } \begin{pmatrix} q1 = q2 \\ r1 = r2 \end{pmatrix} \end{cases} \quad (6)$$

Figure 4:
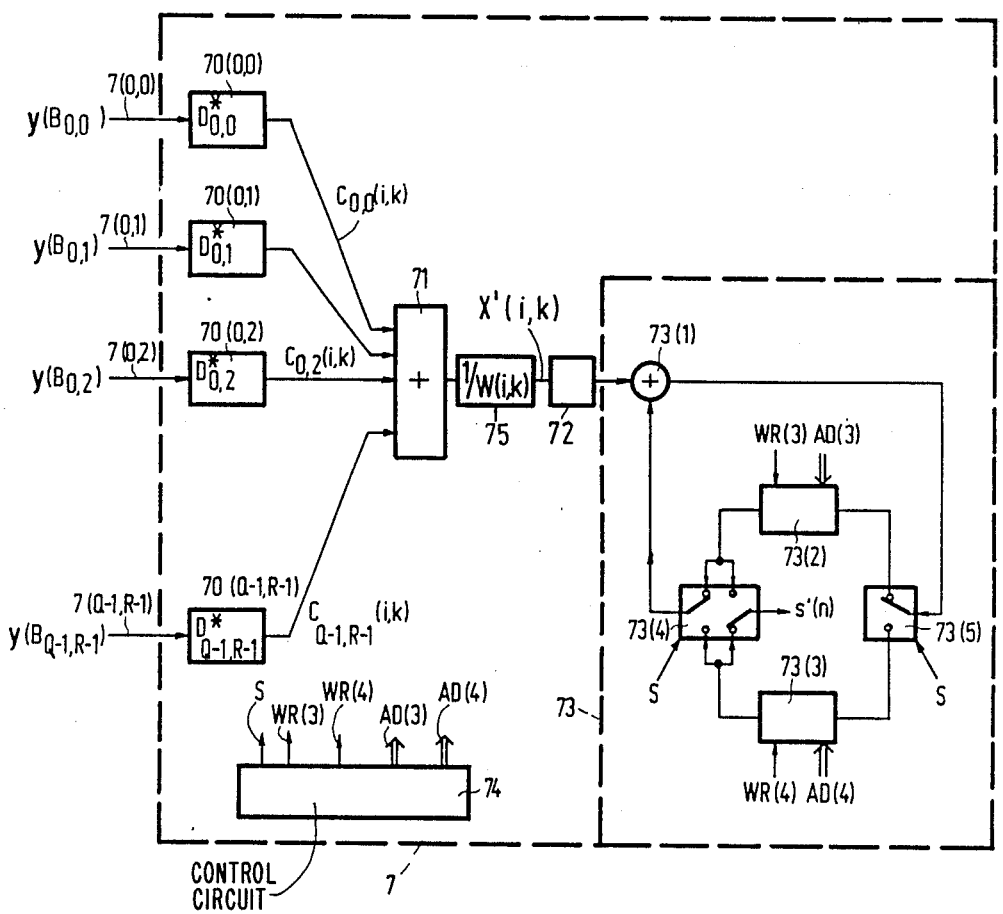
FIG. 4 shows an embodiment of a weighting factor transform circuit for performing an inverse transform.

An embodiment of the weighting transform circuit 7 for performing an inverse transform in order to obtain a good approximation of the original sub-picture from each group of transmitted weighting factors $Y(B_{q,r})$ is shown in FIG. 4. It comprises Q.R input leads 7(O,O) to 7(Q-1,R-1). Input lead 7(q,r) receives the transmitted weighting factor $Y(B_{q,r})$. Each input lead 7(q,r) incorporates a pattern picture generator 70(q,r) which supplies the auxiliary sub-picture $C_{q,r}(i,k)$ which is equal to the product of the weighting factor $Y(B_{q,r})$ and the kernel picture $D^*_{q,r}(i,k)$. The auxiliary sub-pictures thus obtained are added in an adder circuit 71 which thereby supplies an auxiliary sum sub-picture from which a local sub-picture X'(i,k) is produced by division by a correction picture W(i,k) in a divider circuit 75 and which is a reconstructed version of the original sub-picture.

More particularly this correction picture is equal to the sum of all reference pictures associated with the different sub-pictures. Or in mathematical terms:

$$W(i,k) = \sum_p \sum_q V(i - pT_1, k - qT_2) \quad (7)$$

in which $T_1$ and $T_2$ represent the distances between the successive sub-pictures in the horizontal and vertical directions.

The reconstructed sub-picture X'(i,k) thus obtained is stored in a picture memory 72, more specifically in such memory locations as correspond to the location which this sub-picture had in the original picture. This picture memory thus comprises an auxiliary picture consisting of 576×720 pixel values in which only those pixel values differ from zero which correspond to the last supplied reconstructed sub-picture X'(i,k). All sub-pictures which are obtained on the basis of the reconstructed sub-pictures of a picture are accumulated in an accumulator circuit 73. In this embodiment this circuit is formed by an adder 73(1) which receives the pixel values from the picture memory 72 on the one hand and which receives pixel values of corresponding pixels from either a picture memory 73(2) or a picture memory 73(3) on the other hand. The sum of the two pixel values is written in picture memories 73(2) and 73(3), respectively. These picture memories can be connected to an input and to the output of the adder 73(1) in the manner shown in the Figure by means of switching devices 73(4) and 73(5) which are shown diagrammatically. These picture memories 73(2) and 73(3) are provided with addressable memory locations and are controlled by write-read commands WR(3) and WR(4) in such a way that the locations of one of the picture memories are addressed one after the other and line by line, whilst the pixel value stored in the addressed memory location is applied via switching device 73(4) to the adder 73(1) for generating a pixel sum value which is subsequently applied via switching device 73(5) to the same picture memory and is stored in the same memory location. Simultaneously, the pixel values which are present in the other picture memory at that moment are read one after the other and line by line and are applied as signal samples s'(n) via switching device 73(4) to its output. The address words AD(3) and AD(4) determine at which location in such a picture memory 73(2), 73(3) a pixel value is stored or which pixel value is read. Like the write-read command and a selection signal S controlling the switching devices 73(4), 73(5), they are generated by a control circuit 74 in the conventional manner. It is to be noted that whenever the selection signal S connects the input and the output of a picture memory to the output and the input, respectively, of the adder, the picture memory is also reased. As may be apparent from the foregoing this takes place whenever the first weighting factor of the first sub-picture of a picture is received.

A picture whose pixel values of the different pixels is described by a function which is an accurate description of the sensitivity characteristic of the eye is preferably chosen as a reference picture. Such a function is the Gauss function. A two-dimensional Gauss function for a two-dimensional reference picture is defined as follows.

$$V(i,k) = V(i)\cdot V(k) \quad (8)$$

$$V(x) = \frac{1}{\sqrt{\sigma\sqrt{\pi}}} e^{-x^2/(2\sigma^2)} \quad (8a)$$

The basic pictures $B_{q,r}$ associated with this reference picture are known as the two-dimensional Hermite polynomials which are defined as follows:

$$H_{q,r}(i,k) = H_q(i)\cdot H_r(k) \quad (9)$$

$$H_m(x) = e^{x^2/\sigma^2} \frac{d^m}{di^m}\left(\frac{1}{\sigma\sqrt{\pi}} e^{-x^2/\sigma^2}\right) \quad (9a)$$

The kernel pictures $D^*_{q,r}(i,k)$ now represent the two-dimensional Hermite functions. They are defined as follows:

$$D^*_{q,r}(i,k) = D^*_q(i)\cdot D^*_r(k) \quad (10)$$

$$D_m(x) = \frac{1}{\sqrt{2^m m!}} \cdot \frac{1}{\sigma\sqrt{2\pi}} H_m(x)e^{-x^2/(2\sigma^2)} \quad (10a)$$

For the correction picture W(i,k) it then holds that:

$$W(i,k) = W(i) \cdot W(k) \quad (11)$$

$$W(x) = \sum_m V(x - mT) \quad (11a)$$

in which T is the distance between successive sub-pictures and $\sigma$ is a constant.

Another function which is closely related to the sensitivity characteristic of the eye is the binominal function. On this basis a reference picture can be defined whose pixel values of the different pixels are defined as the square root of the binominal coefficients. The associated basic pictures are described by so-called Krawtchouk polynomials.

General Remarks

In the embodiment of the picture transform circuit 2 which is shown in FIG. 2 the sub-picture X(i,k) is first multiplied by the reference picture V(i,k) and subsequently the product picture PRD(i,k)=X(i,k) V(i,k) is multiplied by each of the kernel pictures $D^*_{q,r}(i,k)$ in the multiplier and adder 23(q,r). It will be obvious to those skilled in the art that this multiplier and adder can be formed in such a way that its original function is interwoven with that of multiplier circuit 22; in other words, the mathematical operation $$Y(B_{q,r}) = \sum_i \sum_k B_{q,r}(i,k) V^2(i,k) X(i,k) \quad (12)$$

is directly performed therein.

In a corresponding manner the function of the divider circuit 75 in the weighting factor transform circuit 7 which is shown in FIG. 4 can be interwoven with that of the pattern picture generator 70(p,q) such that its function can be mathematically written as follows:

$$X'(i,k) = \sum_q \sum_r Y(B_{q,r}) D^*_{q,r}(i,k) V(i,k) / W(i,k) \quad (13)$$

It has been assumed in the foregoing that all sub-pictures and basic pictures are two-dimensional. However, the foregoing also applies if one-dimensional or three-dimensional sub-pictures and basic pictures are chosen.

I claim:

1. A television transmission system for transmitting a picture represented by a digital picture signal from an encoding station to a decoding station, the encoding station being adapted to partition the picture into sub-pictures of $N_1 \times N_2$ pixels each for performing a forward transform for generating basic picture weighting factors, the decoding station being adapted to perform an inverse transform for generating a local sub-picture consisting of $N_1 \times N_2$ pixels, characterized in that
for the forward transform
  (i) each sub-picture is multiplied by a reference picture having different values for different pixels, so that each time a product sub-picture is obtained;
  (ii) each product sub-picture is multiplied by a number of kernel pictures for generating a number of blocks of product element values corresponding to the number of kernel pictures, each kernel picture being equal to the product of the reference picture and a basic picture from a collection of basic pictures each being formed by an orthogonal polynomial associated with the square value of the reference picture;
  (iii) all product element values of a block are added together for generating a weighting factor;
for the inverse transform
  (iv) each weighting factor is multiplied by a kernel picture for generating a number of auxiliary sub-pictures;
  (v) the auxiliary sub-pictures thus obtained are added together.

2. An encoding station for use in a television transmission system as claimed in claim 1 for transmitting a picture represented by a digital picture signal to a decoding station and being adapted to partition the picture into sub-pictures of $N_1 \times N_2$ pixels each for performing a forward transform for converting each sub-picture into basic picture weighting factors, characterized in that for the forward transform
  (i) each sub-picture is multiplied by a reference picture which has different values for different pixels so that each time a product sub-picture is obtained;
  (ii) each product sub-picture is multiplied by a number of kernel pictures for generating a number of blocks of product element values corresponding to the number of kernel pictures, each kernel picture being equal to the product of the reference picture and the basic picture from a collection of basic pictures each being formed by an orthogonal polynomial associated with the square value of the reference picture;
  (iii) all product element values of a block are added together for generating a weighting factor.

3. An encoding station as claimed in claim 2, characterized in that the pixel values of the different pixels of the reference picture are described by a Gauss function and in that the pixel values of the different pixels of each of the basic pictures are described by a discrete band-limited Hermite polynomial.

4. An encoding station as claimed in claim 2, characterized in that the pixel values of the different pixels of the reference picture are described by the square root of the binominal coefficients and in that the pixel values of the different pixels of each of the basic pictures are described by a Krawtchouk polynomial.

5. A decoding station suitable for use in a television transmission system as claimed in claim 1 and suitable for receiving weighting factors which are generated by an encoding station, said decoding station being adapted to perform an inverse transform for converting weighting factors into a local sub-picture comprising $N_1 \times N_2$ pixels, characterized in that for the inverse transform
  (i) each weighting factor is multiplied by a kernel picture for generating a number of auxiliary sub-pictures;
  (ii) the auxiliary sub-pictures thus obtained are added together.

6. A decoding station as claimed in claim 5, characterized in that each kernel picture is equal to the product of a reference picture and a basic picture from a collection of basic pictures each being formed by an orthogonal polynomial associated with the square value of the reference picture.

7. A decoding station as claimed in claim 5, characterized in that for the inverse transform each auxiliary sub-picture is further divided by a correction picture which is equal to the mathematical sum of shifted versions of the reference picture.

8. A decoding station as claimed in claim 6, characterized in that the pixel values of the different pixels of the reference picture are described by a Gauss function and in that the pixel values of the different pixels of each of the basic pictures are described by a discrete band-limited Hermite polynomial.

9. A decoding station as claimed in claim 6, characterized in that the pixel values of the different pixels of the reference picture are described by the square root of the binominal coefficients and in that the pixel values of the different pixels of each of the basic pictures are described by a Krawtchouk polynomial.

10. A decoding station as claimed in claim 6, characterized in that for the inverse transform each auxiliary subpicture is further divided by a correction picture which is equal to the mathematical sum of shifted versions of the reference picture.

* * * * *